US012689298B2

(12) United States Patent
Dietrich et al.

(10) Patent No.: US 12,689,298 B2
(45) Date of Patent: Jul. 21, 2026

(54) CONTROL CIRCUIT AND METHOD FOR CONTROLLING MODE TRANSITION IN A DC/DC CONVERTER

(71) Applicant: Renesas Design (UK) Limited, Bourne End (GB)

(72) Inventors: Stefan Dietrich, Uebach-Palenberg (DE); Eduardas Jodka, Freiburg (DE); Christian Gehle, Karlsfeld (DE)

(73) Assignee: Renesas Design (UK) Limited, Bourne End (GB)

( * ) Notice: Subject to any disclaimer, the term of this patent is extended or adjusted under 35 U.S.C. 154(b) by 203 days.

(21) Appl. No.: 18/441,419

(22) Filed: Feb. 14, 2024

(65) Prior Publication Data

US 2025/0260325 A1    Aug. 14, 2025

(51) Int. Cl.
*H02M 3/158* (2006.01)

(52) U.S. Cl.
CPC ................................. *H02M 3/1582* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575;

G05F 1/30; G05F 1/33; G05F 1/32; G05F 1/34; G05F 1/38; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06;
(Continued)

(56) References Cited

U.S. PATENT DOCUMENTS

| | | | | |
|---|---|---|---|---|
| 2006/0273772 A1* | 12/2006 | Groom | .................. | H02M 3/157 |
| | | | | 323/284 |
| 2011/0241641 A1* | 10/2011 | Chen | .................. | H02M 3/1588 |
| | | | | 323/284 |

(Continued)

*Primary Examiner* — Crystal L Hammond
*Assistant Examiner* — Nusrat Quddus
(74) *Attorney, Agent, or Firm* — SCULLY, SCOTT, MURPHY & PRESSER, P.C.

(57) ABSTRACT

A control circuit for controlling a power converter is provided. The control circuit is configured to operate the power converter in a PFM mode, using a set of activated PFM functional blocks, while a set of PWM functional blocks for operating the power converter in a PWM mode is inactive. Furthermore, the control circuit is configured, in preparation of a transition from operating the power converter in the PFM mode to operating the power converter in the PWM mode, to enter a handover state, within which the power converter is operated in the PFM mode and one or more PWM functional blocks of the set of PWM functional blocks are activated.

17 Claims, 4 Drawing Sheets

(58) Field of Classification Search
CPC ........ H02M 7/068; H02M 7/153; H02M 7/10;
H02M 1/088; H02M 7/103; H02M 7/106;
H02M 7/19; H02M 7/08; H02M 7/17;
H02M 2001/007; H02M 7/493; H02M
7/53806; H02M 7/5381; H02M 7/483;
H02M 7/217; H02M 7/538466; H02M
7/5387; H02M 7/53871; H02M 7/53873;
H02M 7/53875; H02M 1/084; H02M
1/0845; H02M 3/07; H02M 3/073; H02M
2003/071; H02M 2003/072; H02M
2003/075; H02M 2003/076; H02M
2003/077; H02M 2003/078; H02M
2001/0048; H02M 1/12; H02M 3/3155;
H02M 3/33507; H02M 3/33546; H02M
7/1557; H02M 7/1626; H02M 1/4208;
H02M 7/219; H02M 7/151; H02M
1/4233; H02M 5/4585; H02M 1/08;
H02M 7/1552; H02M 7/1623; H02M
1/4225; H02M 3/33592; H02M 3/137;
H02M 7/00; H02M 7/064; H05B 39/048;
B23K 11/24; H04B 2215/069; H02J 3/46;
H02J 3/38; H02J 7/12
See application file for complete search history.

(56) References Cited

U.S. PATENT DOCUMENTS

| | | | | |
|---|---|---|---|---|
| 2012/0217946 A1* | 8/2012 | Ju | .......................... | H02M 3/156 |
| | | | | 323/285 |
| 2015/0214827 A1* | 7/2015 | Yoon | ....................... | H02M 1/14 |
| | | | | 323/286 |
| 2019/0157975 A1* | 5/2019 | Vanin | ....................... | H03K 7/08 |
| 2020/0127566 A1* | 4/2020 | Lazaro | ................ | H02M 1/0061 |
| 2021/0083583 A1* | 3/2021 | Becker | ..................... | H03K 5/24 |
| 2024/0146173 A1* | 5/2024 | Ji | ......................... | H02M 3/1582 |
| 2025/0062674 A1* | 2/2025 | Alevoor | ................ | H02M 3/158 |

* cited by examiner

CONTROL CIRCUIT AND METHOD FOR CONTROLLING MODE TRANSITION IN A DC/DC CONVERTER

TECHNICAL FIELD

The present document relates to a control circuit and a corresponding method for controlling a DC/DC converter.

BACKGROUND

A DC/DC converter may be operated in different operating modes of operation in order to optimize the efficiency of the converter across a wide range of input voltages and/or output load currents. For example, as illustrated in FIG. 1a, Pulse-Frequency Modulation (PFM) typically has a higher operating efficiency 101 for relatively low load currents 102 and continuous conduction modulation (CCM) typically has a higher operating efficiency 101 for relatively high load currents 102. The optimum operating efficiency 101 may be achieved by operating the power converter in the PFM mode for load currents 102 that are at or below a pre-determined load current threshold and by operating the power converter in the CCM mode for load currents 102 that are above the pre-determined load current threshold.

It should be noted that Discontinuous Conduction Modulation (DCM) and Continuous Conduction Modulation (CCM) are examples for Pulse Width Modulation (PWM). The aspects outlined in the context of CCM operation are applicable to PWM operation in general.

FIG. 1b illustrates the operation of a power converter in PFM mode for relatively low load currents 102. This allows the power switches of the power converter to be operated at a relatively low switching frequency 103, thereby enabling an efficient operation of the power converter. Within the PFM mode, regulation of the output voltage of the power converter may be achieved by varying the switching frequency 103.

As the load current 102 increases, the switching frequency 103 increases (up to a maximum frequency 109, which may also be referred to as the PWM frequency), eventually triggering a mode transition from the PFM mode to the CCM mode (i.e. to the PWM mode). Within the PWM mode, regulation of the output voltage may be achieved by increasing the duty cycle of the one or more power switches of the power converter via pulse-width modulation.

The mode transition from the PFM mode to the PWM mode and the corresponding transition of the regulation scheme from PFM to PWM may impact the stability of regulation of the output voltage of the power converter. The present document addresses the technical problem of performing an efficient mode transition from the PFM mode to the PWM mode that ensures a stable regulation of the output voltage of the power converter. The technical problem is solved by the independent claims. Preferred examples are described in the dependent claims.

SUMMARY

According to an aspect, a control circuit for controlling a power converter is described. The control circuit is configured to operate the power converter in a pulse frequency modulation (PFM) mode, using a set of activated PFM functional blocks (of the control circuit), while a set of PWM functional blocks (of the control circuit) for operating the power converter in a pulse width modulation (PWM) mode is inactive. Furthermore, the control circuit is configured, in preparation of a transition from operating the power converter in the PFM mode to operating the power converter in the PWM mode, to enter a handover state, within which the power converter is operated in the PFM mode, and within which one or more PMW functional blocks of the set of PWM functional blocks are activated (while one or more other PWM functional blocks of the set of PWM functional blocks are maintained inactive).

According to another aspect, a method for controlling a power converter is described. The method comprises operating the power converter in a PFM mode, using a set of activated PFM functional blocks, while a set of PWM functional blocks for operating the power converter in a PWM mode is inactive. Furthermore, the method comprises, in preparation of a transition from operating the power converter in the PFM mode to operating the power converter in the PWM mode, entering a handover state, within which the power converter is operated in the PFM mode, and within which one or more PWM functional blocks of the set of PWM functional blocks are activated.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

BRIEF DESCRIPTION OF THE FIGURES

The invention is explained below in an exemplary manner with reference to the accompanying drawings, wherein.

DETAILED DESCRIPTION

As indicated above, the present document relates to providing a stable regulation of the output voltage of a DC/DC power converter during a mode transition from PFM mode to CCM mode (i.e. to PWM mode). The quality of regulation of the output voltage may notably be affected in case of a sudden dynamic load change which forces the power converter to switch modes rapidly.

Figure 1A:
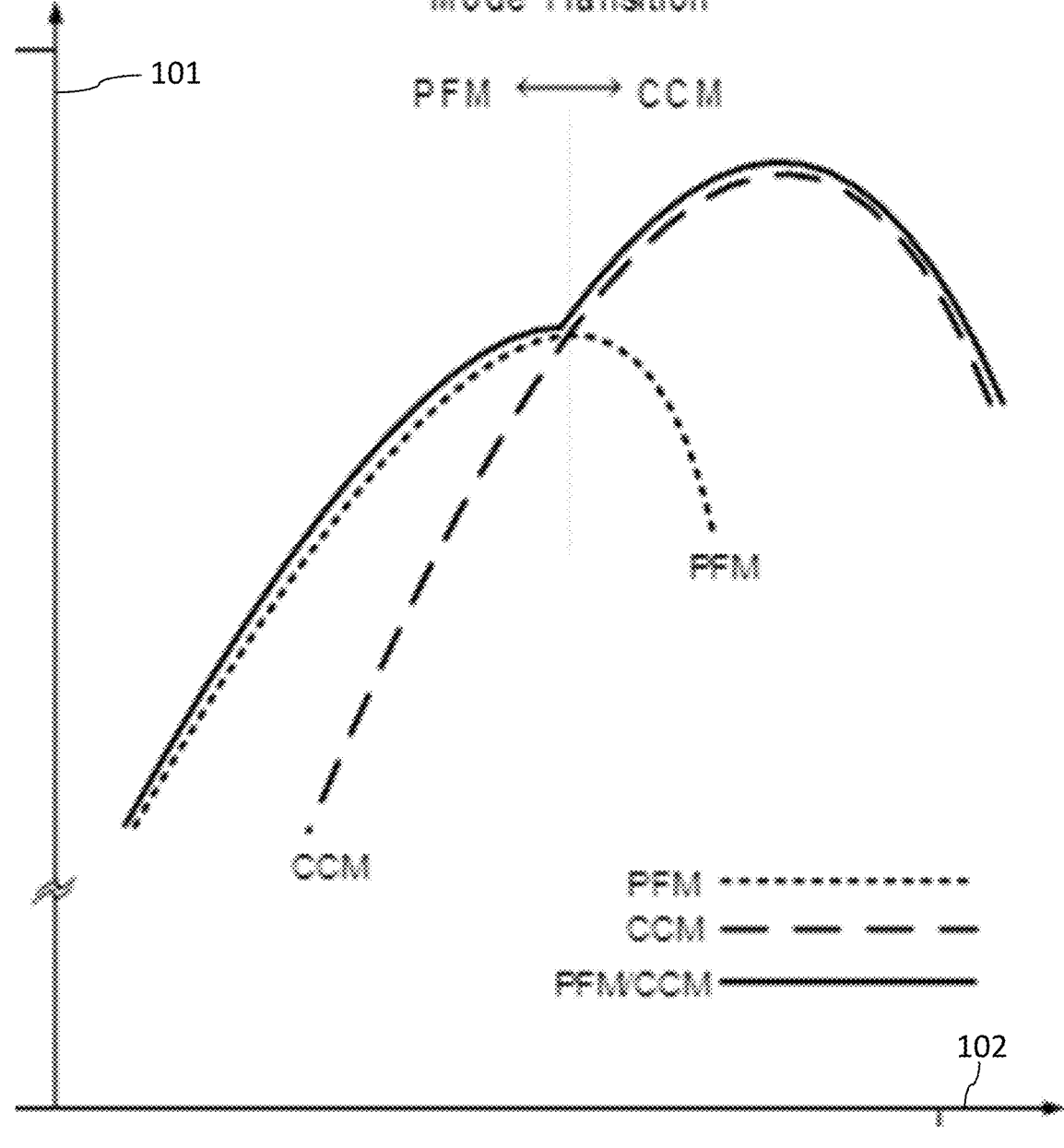
FIG. 1a illustrates the operating efficiency of different operating modes of a power converter.
Figure 1B:
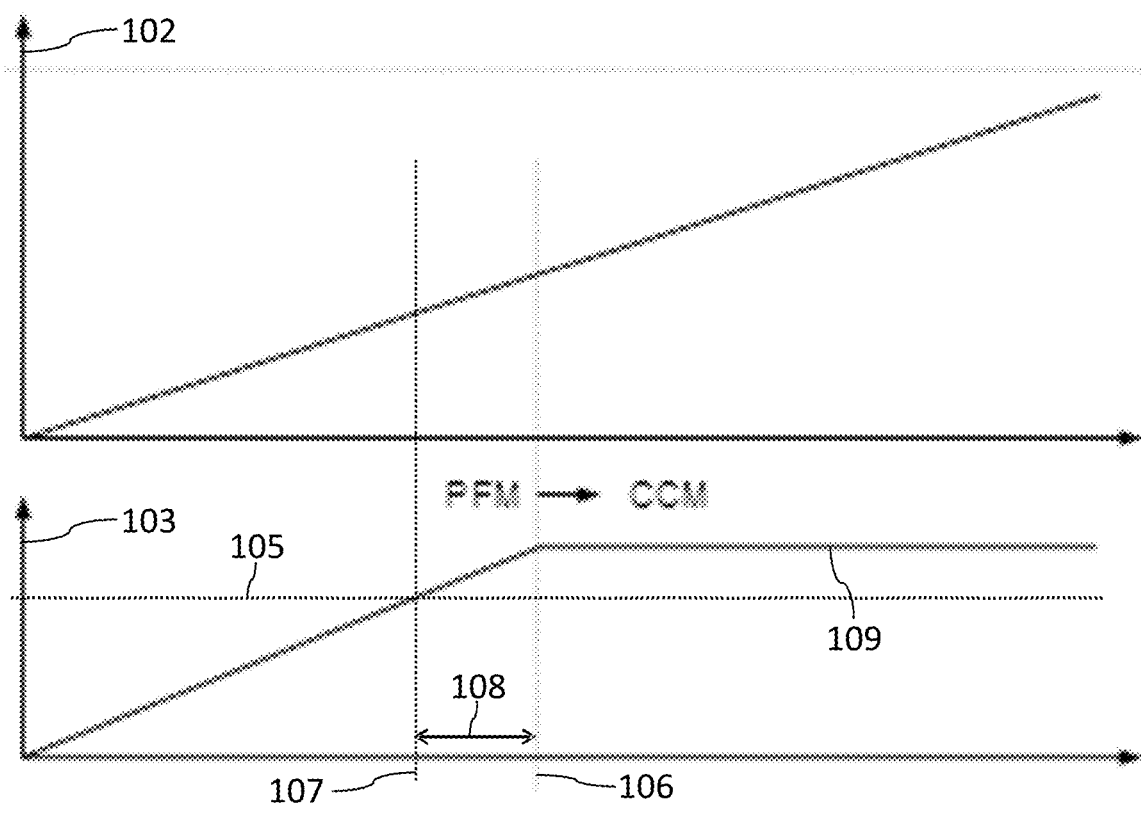
FIG. 1b illustrates a mode transition from PFM mode to CCM (i.e. PWM) mode.
Figure 1C:
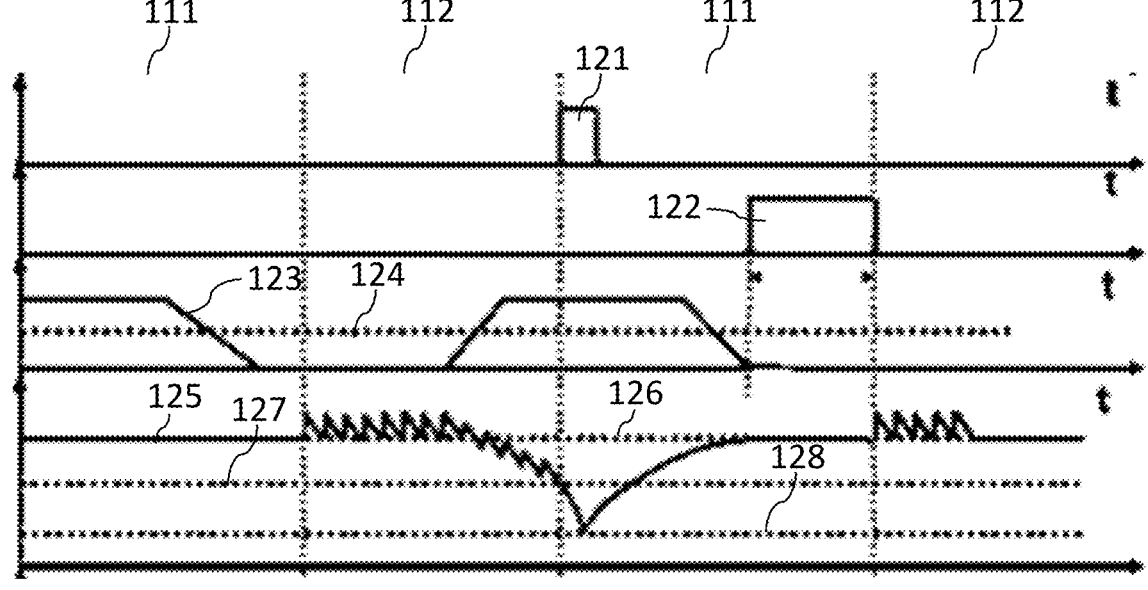
FIG. 1c shows the level of the output voltage during a mode transition from PFM mode to CCM (i.e. PWM) mode.

FIG. 1c illustrates an example PFM-CCM transition which is triggered by a so-called panic comparator, wherein the panic comparator detects that the output voltage 125 (which is regulated to a given target voltage 126) falls below a pre-determined panic threshold 127.

One of the advantages of PFM operation is that it makes use of a relatively simple control scheme. As a result of this, many of the functional blocks of the control circuit of the power converter (which are used for operating the power converter in the CCM mode) may be placed in an inactive state while the power converter is operated in the PFM mode. As a result of this, the overall power consumption may be reduced.

During the transition from PFM mode to CCM mode, all the functional blocks which are required for the CCM mode are enabled and/or activated. However, due to the fact that these functional blocks had been deactivated within the PFM mode, the CCM mode starts operation with an unbiased regulation. As a result, the PFM-CCM transition may lead to a significant drop of the output voltage 125 (down to the level 128 indicated in FIG. 1c), since the regulation loop needs to first reach the output load current handover between the PFM mode and the CCM mode and then needs to reverse the output voltage drop.

FIG. 1c illustrates a transition from the PFM mode 112 to the CCM mode 111 which is caused by a sudden increase of the load current 123 (above the pre-determined transition threshold 124, which is used for performing a planned transition from the PFM mode 112 to the CCM mode 111). The sudden increase of the load current 123 leads to a drop of the output voltage 125 that triggers the panic comparator (indicated by the panic pulse 121), which causes an immediate transition to the CCM mode 111.

FIG. 1c also illustrates how a sudden drop of the load current 123 within the CCM mode 112 may put the regulation into a sleep state (indicated by the pulse 122).

As illustrated in FIG. 1c, the sudden transition from PFM mode 112 (with a relatively high voltage ripple) to the CCM mode 112 (which is a clocked operation using a fixed clock) may lead to a significant drop of the output voltage 125. Furthermore, the panic threshold 127 is typically set to a voltage that is safely below the loop DC inaccuracy plus the ripple, such that the panic comparator is not trigged during normal operation. As a result of this, the panic comparator may be triggered relatively late (thereby further affecting the output voltage 125).

Figure 2:
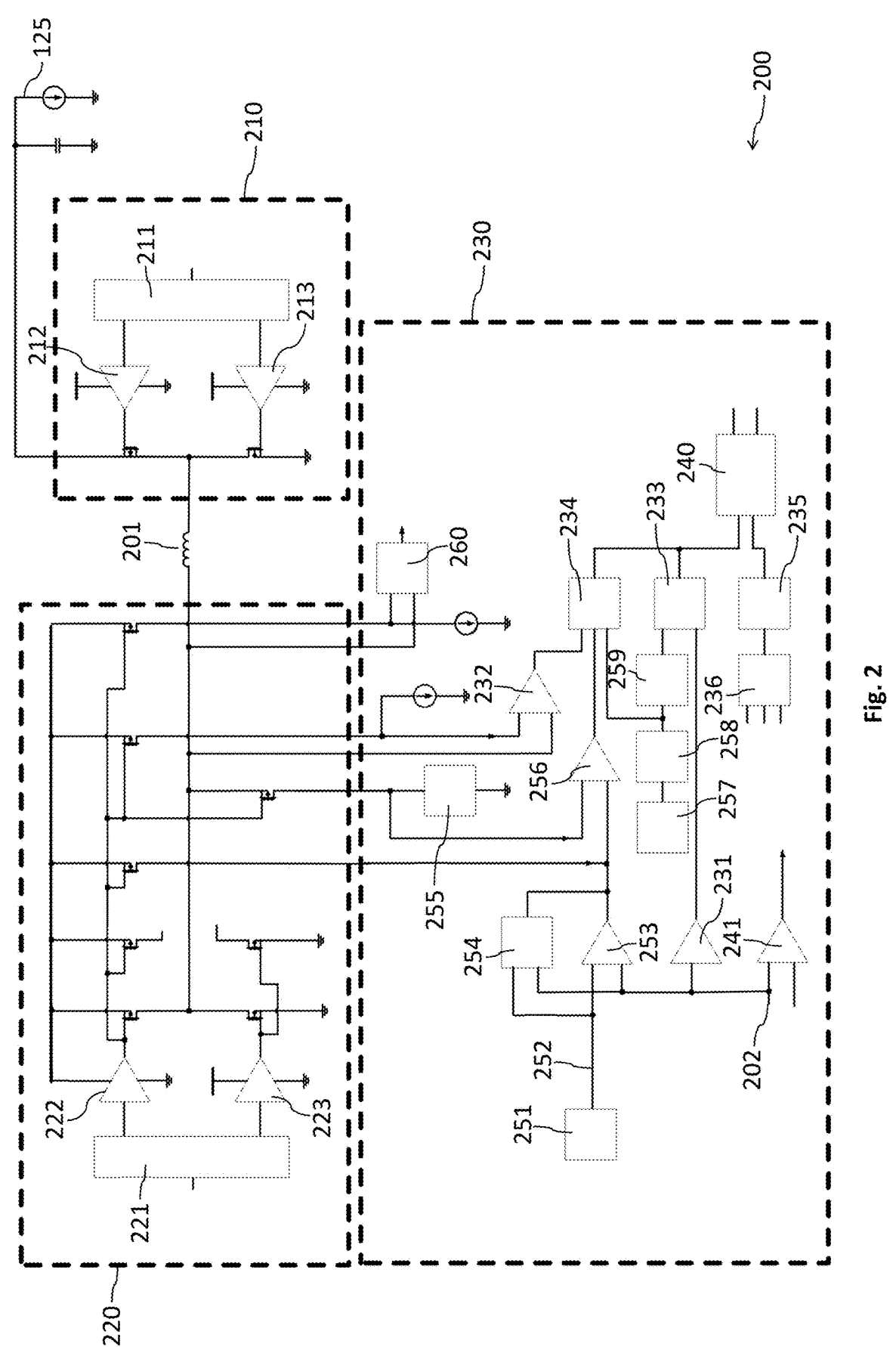
FIG. 2 shows a converter system comprising a power converter and a control circuit for controlling the power converter.

FIG. 2 shows a block diagram of an example converter system 200 which comprises a power converter 210, 220, notably a buck converter 210 and a boost converter 220 with an inductor 201, each converter 210, 220 comprising driver circuitry 211, 212, 213, 221, 222, 223. The system 200 further comprises a control circuit 230, wherein the control circuit 230 comprises one or more PFM functional blocks 232, 253, which are only needed for the PFM mode 112;

one or more PWM functional blocks 253, 254, 256, 257, 258, 259, 260, which are only needed for the PWM (notably the CCM) mode 111; and one or more common function blocks 234, 233, 235, 236, 240, 241, 251, which may be used jointly for the PFM mode 112 and the PWM mode 111.

Figure 3A:
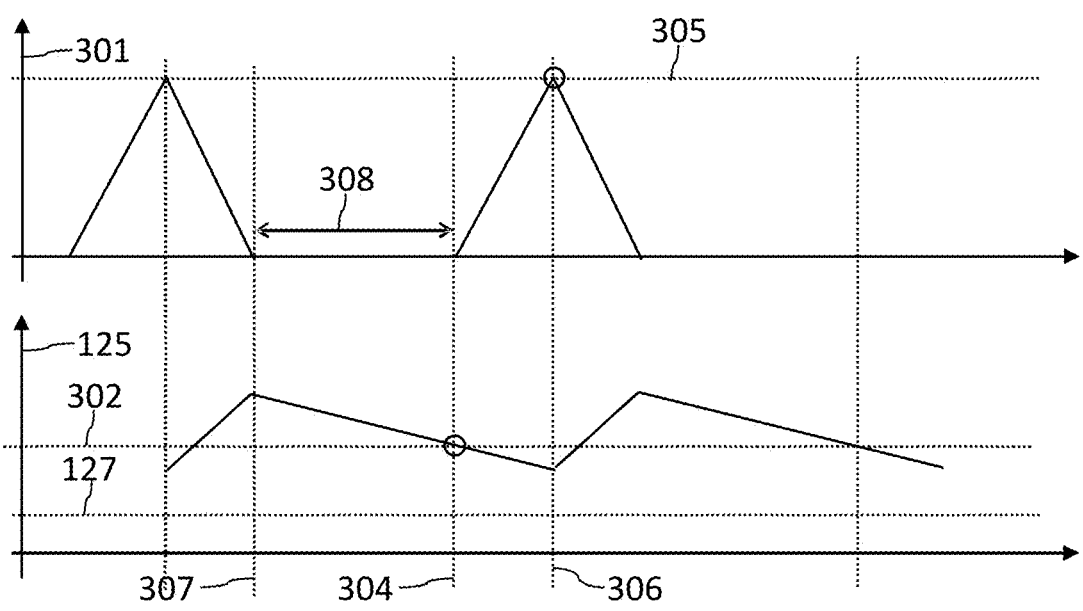
FIG. 3a illustrates the generation of the ON-triggers and the OFF-triggers for controlling the high side switch of the power converter within the PFM mode.

FIG. 3a illustrates the inductor current 301 (through the inductor 201) and the output voltage 125 as a function of time, within the PFM mode 112. The control circuit 230 is configured to repeatedly generate an ON-trigger 304 for causing the one or more high-side switches of the power converter 210, 220 to turn on (and for causing the one or more low-side switches of the power converter 210, 220 to turn off); and an OFF-trigger 306 for causing the one or more high-side switches of the power converter 210, 220 to turn off (and for causing the one or more low-side switches of the power converter 210, 220 to turn on).

Within the PFM mode 112, the output voltage 125 may be compared with a pre-determined voltage threshold 302 (which is typically lower than the target voltage 126, 252 for the output voltage 125 and/or higher than the panic threshold 127). When the output voltage 125 reaches and/or falls below the pre-determined voltage threshold 302 (which may be detected by the PFM functional block 253), an ON-trigger 304 may be generated.

Once the one or more high-side switches of the power converter 210, 220 are turned on, the inductor current 301 increases. The inductor current 301 may be compared to a pre-determined (fixed) current threshold 305 (within the PFM functional block 232). The OFF-trigger 306 may be generated, when the inductor current 301 reaches the pre-determined current threshold 305.

Once the one or more high-side switches of the power converter 210, 220 are turned off, the inductor current 301 decreases and eventually falls to zero (at time instant 307). This causes the output voltage 125 to drop, which will eventually cause the generation of a subsequent ON-trigger 304.

An increase of the load current 123 causes the output voltage 125 to drop faster, thereby causing the subsequent ON-trigger 304 to be generated more rapidly, i.e. thereby increasing the switching frequency 103 of the one or more high-side switches of the power converter 210, 220. Eventually, the time gap 308 between the time instant 307 at which the inductor current 301 falls to zero and the subsequent ON-trigger 304 falls to zero, such that the maximum switching frequency 109 of the PFM mode 112 (which may be equal to the PWM frequency) is reached.

Figure 3B:
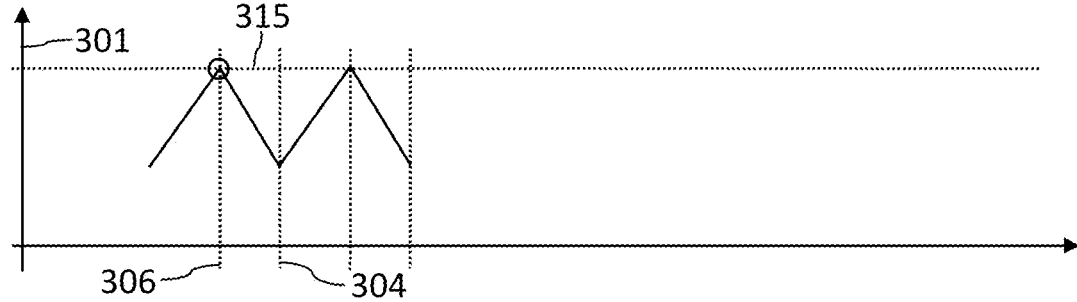
FIG. 3b illustrates the generation of the ON-triggers and the OFF-triggers within the CCM (i.e. PWM) mode.

FIG. 3b illustrates the inductor current 301 as a function of time within the PWM mode 111. Within the PWM mode 111 the ON-triggers 304 are generated using a fixed clock signal (which is provided by the PWM functional block 257, possibly in conjunction with the PWM functional blocks 258, 259). The OFF-triggers 306 are generated by comparing the inductor current 301 with an adaptive peak current threshold 315. The comparison may be performed within the PWM functional block 256. An OFF-trigger 306 may be generated when the inductor current 301 reaches the adaptive peak current threshold 315.

The adaptive peak current threshold 315 may be dependent on the error voltage which is indicative of the deviation of the output voltage 125 from the target voltage 126, 252 (which is provided e.g. by a digital-to-analog converter 251). The error voltage may be generated by the PWM functional blocks 253, 254.

Additional function blocks of the control circuit 230 may be a PWM functional block 255 for generating a ramp signal (which is typically used for generating the OFF-triggers 306);

a PWM functional block 260 for detecting a sleep demand (for putting the PWM regulation into sleep);

a common functional block 241 for short circuit protection;

one or more common functional blocks 235, 236 for zero cross detection;

a common functional block 234 for generating an OFF-trigger 306;

a common functional block 233 for generating an ON-trigger 304; and/or a common functional block 240 for logic operations.

The control circuit 230 may be configured to operate within a handover state for preparing a transition from the PFM mode 112 to the PWM mode 111. Within the handover state, the power converter 210, 220 is operated within the PFM mode 112, such that the PFM functional blocks and the common functional blocks are active. Furthermore, a subset of the PWM functional blocks may be activated for pre-biasing the subsequent PWM based regulation. In particular, the one or more PWM functional blocks 253, 254 for generating the error voltage may be activated, in order to ensure that the adaptive peak current threshold 315 is at a correct level, when the power converter 210, 220 starts operating within the PWM mode 111; and/or the PWM functional block 256 for comparing the inductor current 301 to the adaptive peak current threshold 315 may be activated, in order to ensure that the comparator is in a settled state, when the power converter 210, 220 starts operating within the PWM mode 111.

On the other hand, one or more other PWM functional blocks may remain inactive during the handover state, e.g., the PWM functional block 255 for generating the ramp signal;

the PWM functional block 260 for detecting a sleep demand; and/or the one or more functional blocks 257, 258, 259 for generating the clock signal.

The control circuit 230, e.g. the logic block 240, may be configured to detect that a handover condition for entering the handover state is met. In reaction to this, the control circuit 230 may be put into the handover state, while maintaining operation of the power converter 210, 220 within the PFM mode 112. The actual transition to the PWM mode 111 may be triggered by the fact that the switching frequency 103 reaches the maximum frequency 109;

by the fact that the load current 123 exceeds the load current threshold 124; and/or by the fact that the panic comparator is triggered.

In view of the fact that the control circuit 230 has been prepared for the PWM mode 111 within the handover state, the drop of the output voltage 125 may be substantially reduced.

An example condition for entering the handover state may be the fact that the switching frequency 103 reaches a pre-determined handover frequency 105 (as illustrated in FIG. 1*b*). By consequence, the handover state 108 may be provided for switching frequencies 103 between the handover frequency 105 and the maximum frequency 109.

Hence, a control of a multi-mode power converter 210, 220 is described, for which the delay time of the transition between PFM and PWM control is reduced. Specifically, while still operating in PFM mode 112, one or more functional blocks needed for the PWM mode 111 may be pre-biased in anticipation of a PFM to PWM transition.

In other words, a third operating mode, in addition to the PFM and PWM mode, is described. This third operating mode is a handover state 108 for a transition from PFM to PWM operation (i.e. from relatively small to relatively high load currents 102). The handover state 108 operates the converter 210, 220 in PFM operation, while at the same time causing a pre-bias of one or more functional blocks which are needed in PWM operation. The handover state 108 may be initiated once the PFM mode load current capability is about to reach its maximum, while the converter DC voltage regulation is not yet lost.

Once the one or more PWM functional blocks are enabled, the one or more PWM functional blocks operate in parallel to the PFM operation of the converter 210, 220. The control outputs of the one or more PWM functional blocks are ignored as long as the PFM mode 112 is able to support the output load current 102. Once the PFM mode 112 reaches its maximum output load capability and the output load continues to increase, DC regulation is violated and the output voltage 125 starts to drop. The drop of the output voltage 125 leads to an increased controller error signal (i.e. an increased error voltage) which causes the PWM functional blocks to reverse the output voltage drop by regulating to an increased peak current (i.e. to an increased adaptive peak current threshold 315).

The actual transition from PFM operation to PWM operation during the handover state 108 may be caused at the moment when the one or more PWM functional blocks regulate to a higher peak current 315 than the current 305 which is provided by the PFM operation. As a result of this, the output of the one or more PWM functional blocks is not ignored anymore, but is used for the actual transition. As a result of this, a smooth handover between the PFM and the PWM modes may be achieved.

One or more input factors may be used as conditions for initiating the handover state 108. Example input factors are: the PFM operating frequency 103, the number of PFM pulses prior to an idle period, the input voltage and/or the output current. A condition for entering the handover state 108 may be defined based on one or more of these input factors.

The control circuit 230 may be configured to anticipate a transition to the PWM mode 111, when the switching frequency 103 approaches the PWM switching frequency 109. When the PFM switching frequency 103 exceeds a pre-determined PWM sub-block pre-bias threshold 105, one or more of the PWM functional blocks may be pre-biased (within the handover state 108), in preparation for the PFM to PWM transition. This reduces the control delay when the transition actually occurs, thereby reducing disruptions within the output voltage 125.

In view of the fact, that the output load current 102 is relatively high at the transition from PFM to PWM, the activation of the one or more PWM functional blocks does not substantially affect the efficiency of the power converter 210, 220.

As indicated above, when operating the power converter 210, 220 in the handover state 108, the actual mode transition from PFM mode 112 to PWM mode 111 may be caused automatically, once the adaptive peak current threshold 315 (used within the PWM mode 111) reaches and/or exceeds the current threshold 305 (used within the PFM mode 112).

Figure 4:
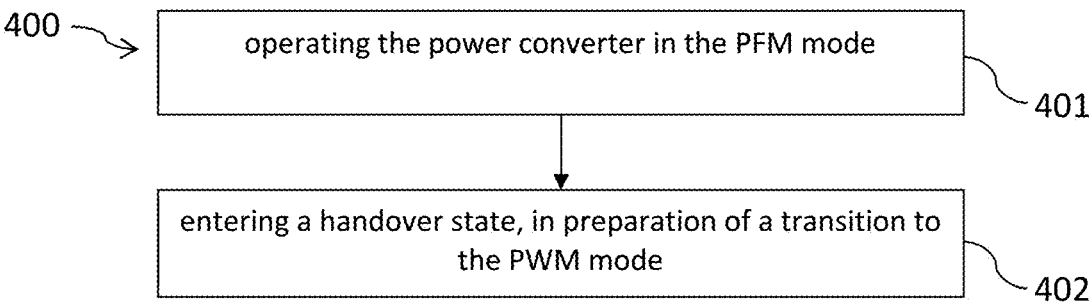
FIG. 4 shows a flow chart of an example method for controlling a power converter.

FIG. 4 shows a flow chart of a (possibly computer-implemented) method 400 for controlling a power converter 210, 220 (notably a switched-mode power converter 210, 220, such as a buck, a boost or a buck-boost converter). The method 400 comprises operating 401 the power converter 210, 220 in a PFM mode 112, using a set of activated PFM functional blocks 231, 232, while a set of PWM functional blocks 253, 254, 255, 256, 257, 258, 259, 260 for operating the power converter 210, 220 in a pulse width modulation, PWM, mode 111 is inactive. As a result of this, a power efficient operation of the power converter 210, 220 (at relatively low load currents 102) is achieved.

The method 400 further comprises, in preparation of a transition from operating the power converter 210, 220 in the PFM mode 112 to operating the power converter 210, 220 in the PWM mode 111, entering 402 a handover state 108, within which the power converter 210, 220 is still operated in the PFM mode 112 (and not yet operated in the PWM mode 111). However, one or more PWM functional blocks 253, 254, 256 (notably a subset) of the set of PWM functional blocks 253, 254, 255, 256, 257, 258, 259, 260 are activated within the handover state 108 (without taking into account the signals which are generated by the one or more activated PWM functional blocks 253, 254, 256 for performing the actual operation of the power converter 210, 220, notably for performing the actual regulation of the output voltage 124 of the power converter 210, 220). As a result of this, a power efficient, stable and smooth transition to the PWM mode 111 may be performed.

Hence, a control circuit 230 for controlling a power converter 210, 220 (notably a switched mode power converter 210, 220) is described. The control circuit 230 is configured to operate the power converter 210, 220 in a PFM mode 112, using a set of activated PFM functional blocks 231, 232, while a set of PWM functional blocks 253, 254, 255, 256, 257, 258, 259, 260 for operating the power converter 210, 220 in a PWM mode 111 (notably a CCM or DCM mode) is inactive. As a result of this, the power consumption of the set of PWM functional blocks 253, 254, 255, 256, 257, 258, 259, 260 can be reduced (possibly to zero).

When operating the power converter 210, 220 in the PWM mode 111, the set of PFM functional blocks 231, 232 may be deactivated and the set of PWM functional blocks 253, 254, 255, 256, 257, 258, 259, 260 may be activated.

The control circuit 230 is further configured, in preparation of a transition from operating the power converter 210, 220 in the PFM mode 112 to operating the power converter 210, 220 in the PWM mode 111, to enter a handover state 108, within which the power converter 210, 220 is still operated in the PFM mode 112. However, one or more PWM functional blocks 253, 254, 256 (notably a subset) of the set of PWM functional blocks 253, 254, 255, 256, 257, 258, 259, 260 may be activated within the handover state 108, thereby preparing a smooth transition to the PWM mode 111.

The one or more PWM functional blocks 253, 254, 256 which are activated in the handover state 108 may be configured to determine the deviation of the output voltage 125 of the power converter 210, 220 from a target voltage 126, 252. In particular, the one or more PWM functional blocks 253, 254, 256 may be configured to determine an error voltage. Alternatively, or in addition, the one or more PWM functional blocks 253, 254, 256 which are activated in the handover state 108 may be configured to determine an adaptive peak current threshold 315 which is used for generating a trigger 306 (notably an OFF-trigger) for turning on or off (notably for turning off) a (high side) power switch of the power converter 210, 220. The adaptive peak current threshold 315 may be dependent on the deviation of the output voltage 125 of the power converter 210, 220 from the target voltage 252 (notably the adaptive peak current threshold 315 may be dependent on the error voltage).

Alternatively, or in addition, the one or more PWM functional blocks 253, 254, 256 which are activated in the handover state 108 may be configured to compare the inductor current 301 through the inductor 201 of the power converter 210, 220 with the (adaptive) peak current threshold 315 for generating a trigger 306 for turning on or off a power switch of the power converter 210, 220.

By activating the above-mentioned one or more PWM functional blocks 253, 254, 256 a particularly smooth transition to the PWM mode 111 may be achieved.

The control circuit 230 may be configured to maintain one or more PWM functional blocks 255, 257, 258, 259, 260 of the set of PWM functional blocks 253, 254, 255, 256, 257, 258, 259, 260 deactivated within the handover state 108. The one or more PWM functional blocks 255, 257, 258, 259, 260 which are maintained deactivated within the handover state 108 may comprise, one or more PWM functional blocks 257, 258, 259 for generating a clock signal;

one or more PWM functional blocks 255 for generating a ramp signal; and/or one or more PWM functional blocks 266 for detecting that the power converter 210, 220 may be put into a sleep condition.

By maintaining one or more PWM functional blocks 255, 257, 258, 259, 260 deactivated within the handover state 108, the efficiency of the power converter 210, 220 may be increased.

The control circuit 230 may be configured to determine that a handover condition for entering the handover state 108 is met. The handover condition 108 may be dependent on, the switching frequency 103 at which the power converter 210, 220 is operated within the PFM mode 112; and/or the load current 123 which is provided at the output of the power converter 210, 220; and/or the input voltage and/or the output voltage 125 of the power converter 210, 220.

The control circuit 230 may be configured to enter the handover state 108, in reaction to determining that the handover condition is met, thereby providing a particularly reliable control of the power converter 210, 220.

The control circuit 230 may be configured to determine (subsequently to entering the handover state 108) that the handover condition is not met anymore. In reaction to determining that the handover condition is not met anymore, the one or more PWM functional blocks 253, 254, 256 which had been activated within the handover state 108 may be deactivated. Furthermore, the power converter 210, 220 may be operated in the PFM mode 112, using the set of activated PFM functional blocks 231, 232, while the set of PWM functional blocks 253, 254, 255, 256, 257, 258, 259, 260 for operating the PWM mode 111 is inactive.

Hence, the control circuit 230 may be configured to revert back to the pure PFM mode 112 in a reliable manner.

The control circuit 230 may be configured to compare the inductor current 301 with a fixed current threshold 305 when operating the power converter 210, 220 in the PFM mode 112 to generate an OFF-trigger 306 for turning off one or more (high side) switches of the power converter 210, 220. Furthermore, the control circuit 230 may be configured to compare the inductor current 301 with the adaptive peak current threshold 315 when operating the power converter 210, 220 in the PFM mode 112 to generate an OFF-trigger 306 for turning off the one or more (high side) switches of the power converter 210, 220.

In addition, the control circuit 230 may be configured to perform the transition from operating the power converter 210, 220 in the PFM mode 112 to operating the power converter 210, 220 in the PWM mode 111 in dependence of the fixed current threshold 305 and the adaptive current threshold 315. In particular, the control circuit 230 may be configured to compare the adaptive current threshold 315 with the fixed current threshold 305. The transition from operating the power converter 210, 220 in the PFM mode 112 to operating the power converter 210, 220 in the PWM mode 111 may be performed, if (notably as soon as) the adaptive current threshold 315 reaches or exceeds the fixed current threshold 305.

The control circuit 230 may be configured to determine the adaptive peak current threshold 315 within the handover state 108 using the one or more activated PWM functional blocks 253, 254, 256. As a result of this, a particularly smooth transition from the PFM mode 112 to the PWM mode 111 may be performed.

The control circuit 230 may be configured to, in the context of the transition from operating the power converter 210, 220 in the PFM mode 112 to operating the power converter 210, 220 in the PWM mode 111, activate the one or more PWM functional blocks 255, 257, 258, 259, 260 from the set of PWM functional blocks 253, 254, 255, 256, 257, 258, 259, 260 that had not been activated in the handover state 108. Furthermore, the set of PFM functional blocks 231, 232 may be deactivated. As a result of this, a particularly smooth transition from the PFM mode 112 to the PWM mode 111 may be performed.

Furthermore, a power converter system 200 is described which comprises a power converter 210, 220 and the control circuit 230 for controlling the power converter 210, 220.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The present disclosure also comprises the following aspects, which are not claims.

1. A control circuit for controlling a power converter; wherein the control circuit is configured to
operate the power converter in a pulse frequency modulation, PFM, mode, using a set of activated PFM functional blocks, while a set of PWM functional blocks for operating the power converter in a pulse width modulation, PWM, mode is inactive; and
enter a handover state, within which
the power converter is operated in the PFM mode; and
one or more PWM functional blocks of the set of PWM functional blocks are activated.

2. The control circuit of aspect 1, wherein the control circuit is configured to enter the handover state in preparation of a transition from operating the power converter in the PFM mode to operating the power converter in the PWM mode.

3. The control circuit of aspect 1 or 2, wherein the one or more PWM functional blocks which are activated in the handover state are configured to
determine a deviation of an output voltage of the power converter from a target voltage; and/or
determine an adaptive peak current threshold which is used for generating a trigger for turning on or off a power switch of the power converter.

4. The control circuit of any one of aspects 1 to 3, wherein the one or more PWM functional blocks which are activated in the handover state are configured to compare an inductor current through an inductor of the power converter with a peak current threshold for generating a trigger for turning on or off a power switch of the power converter.

5. The control circuit of any one of aspects 1 to 4, wherein the control circuit is configured to maintain one or more PWM functional blocks of the set of PWM functional blocks deactivated within the handover state.

6. The control circuit of aspect 5, wherein the one or more PWM functional blocks which are maintained deactivated within the handover state comprise,
one or more PWM functional blocks for generating a clock signal;
one or more PWM functional blocks for generating a ramp signal; and/or
one or more PWM functional blocks for detecting that the power converter may be put into a sleep condition.

7. The control circuit of any one of aspects 1 to 6, wherein the control circuit is configured to
determine that a handover condition for entering the handover state is met; and
enter the handover state, in reaction to determining that the handover condition is met.

8. The control circuit of aspect 7, wherein the handover condition is dependent on,
a switching frequency at which the power converter is operated within the PFM mode; and/or
a load current which is provided at an output of the power converter; and/or
an input voltage and/or an output voltage of the power converter.

9. The control circuit of aspect 7 or 8, wherein the control circuit is configured to
determine that the handover condition is not met anymore; and
in reaction to determining that the handover condition is not met anymore
deactivate the one or more PWM functional blocks which had been activated within the handover state; and
operate the power converter in the PFM mode, using the set of activated PFM functional blocks, while the set of PWM functional blocks for operating the PWM mode is inactive.

10. The control circuit of aspect 2 or any one of aspects 3 to 9 when depending on aspect 2, wherein the control circuit is configured to
compare an inductor current through an inductor of the power converter with a fixed current threshold when operating the power converter in the PFM mode to generate an OFF-trigger for turning off one or more switches of the power converter;
compare the inductor current with an adaptive current threshold when operating the power converter in the PFM mode to generate an OFF-trigger for turning off the one or more switches of the power converter; and
perform the transition from operating the power converter in the PFM mode to operating the power converter in the PWM mode in dependence of the fixed current threshold and the adaptive current threshold.

11. The control circuit of aspect 10, wherein the control circuit is configured to
compare the adaptive current threshold with the fixed current threshold; and
perform the transition from operating the power converter in the PFM mode to operating the power converter in the PWM mode, if the adaptive current threshold reaches or exceeds the fixed current threshold.

12. The control circuit of aspect 10 or 11, wherein the control circuit is configured to determine the adaptive current threshold within the handover state using the one or more activated PWM functional blocks.

13. The control circuit of any one of aspects 10 to 12, wherein the control circuit is configured to determine the adaptive current threshold based on a deviation of an output voltage of the power converter from a target voltage.

14. The control circuit of aspect 2 or any one of aspects 3 to 13 when depending on aspect 2, wherein the control circuit is configured to, in the context of the transition from operating the power converter in the PFM mode to operating the power converter in the PWM mode, activate the one or more PWM functional blocks from the set of PWM functional blocks that had not been activated in the handover state; and/or deactivate the set of activated PFM functional blocks.

15. A power converter system comprising, a power converter; and the control circuit according to any one of aspects 1 to 14 for controlling the power converter.

16. A method for controlling a power converter; wherein the method comprises, operating the power converter in a pulse frequency modulation, PFM, mode, using a set of activated PFM functional blocks, while a set of PWM functional blocks for operating the power converter in a pulse width modulation, PWM, mode is inactive; and entering a handover state, within which the power converter is operated in the PFM mode; and one or more PWM functional blocks of the set of PWM functional blocks are activated.

17. The method of claim 16, wherein the handover state is entered in preparation of a transition from operating the power converter in the PFM mode to operating the power converter in the PWM mode.

The invention claimed is:

1. A control circuit for controlling a power converter, wherein the control circuit is configured to:

operate the power converter in a pulse frequency modulation (PFM) mode using a set of activated PFM functional blocks, wherein under the PFM mode, a set of pulse width modulation (PWM) functional blocks for operating the power converter in a PWM mode is inactive; and enter a handover state, wherein under the handover state:

the power converter is operated in the PFM mode; and one or more PWM functional blocks of the set of PWM functional blocks are activated.

2. The control circuit of claim 1, wherein the control circuit is configured to enter the handover state in preparation of a transition from operating the power converter in the PFM mode to operating the power converter in the PWM mode.

3. The control circuit of claim 1, wherein the one or more PWM functional blocks activated in the handover state are configured to perform at least one of:

determine a deviation of an output voltage of the power converter from a target voltage; and determine an adaptive peak current threshold being used for generating a trigger for turning on or off a power switch of the power converter.

4. The control circuit of claim 1, wherein the one or more PWM functional blocks activated in the handover state are configured to compare an inductor current through an inductor of the power converter with a peak current threshold for generating a trigger for turning on or off a power switch of the power converter.

5. The control circuit of claim 1, wherein the control circuit is configured to maintain at least one PWM functional block of the set of PWM functional blocks deactivated within the handover state.

6. The control circuit of claim 5, wherein the at least one PWM functional block being maintained deactivated within the handover state comprises:

one or more PWM functional blocks for generating a clock signal;

one or more PWM functional blocks for generating a ramp signal; and/or one or more PWM functional blocks for detecting that the power converter may be put into a sleep condition.

7. The control circuit of claim 1, wherein the control circuit is configured to:

determine that a handover condition for entering the handover state is met; and enter the handover state, in reaction to determining that the handover condition is met.

8. The control circuit of claim 7, wherein the handover condition is dependent on at least one of:

a switching frequency at which the power converter is operated within the PFM mode;

a load current which is provided at an output of the power converter; and an input voltage and/or an output voltage of the power converter.

9. The control circuit of claim 7, wherein the control circuit is configured to:

determine that the handover condition is not met anymore; and in reaction to determining that the handover condition is not met anymore:

deactivate the one or more PWM functional blocks which had been activated within the handover state; and operate the power converter in the PFM mode, using the set of activated PFM functional blocks, while the set of PWM functional blocks for operating the PWM mode is inactive.

10. The control circuit of claim 1, wherein the control circuit is configured to:

compare an inductor current through an inductor of the power converter with a fixed current threshold when operating the power converter in the PFM mode to generate an OFF-trigger for turning off one or more switches of the power converter;

compare the inductor current with an adaptive current threshold when operating the power converter in the PFM mode to generate an OFF-trigger for turning off the one or more switches of the power converter; and perform a transition from operating the power converter in the PFM mode to operating the power converter in the PWM mode in dependence of the fixed current threshold and the adaptive current threshold.

11. The control circuit of claim 10, wherein the control circuit is configured to:

compare the adaptive current threshold with the fixed current threshold; and perform the transition from operating the power converter in the PFM mode to operating the power converter in the PWM mode, if the adaptive current threshold reaches or exceeds the fixed current threshold.

12. The control circuit of claim 10, wherein the control circuit is configured to determine the adaptive current threshold within the handover state using the one or more activated PWM functional blocks.

13. The control circuit of claim 10, wherein the control circuit is configured to determine the adaptive current threshold based on a deviation of an output voltage of the power converter from a target voltage.

14. The control circuit of claim 1, wherein the control circuit is configured to, in a transition from operating the power converter in the PFM mode to operating the power converter in the PWM mode perform at least one of:

activate the one or more PWM functional blocks from the set of PWM functional blocks that had not been activated in the handover state; and deactivate the set of activated PFM functional blocks.

15. A power conversion system comprising:

a power converter; and the control circuit according to claim 1 for controlling the power converter.

16. A method for controlling a power converter; the method comprising:

operating the power converter in a pulse frequency modulation (PFM) mode using a set of activated PFM functional blocks, wherein under the PFM mode, a set of pulse width modulation (PWM) functional blocks for operating the power converter in a PWM mode is inactive; and entering a handover state, wherein under the handover state:

the power converter is operated in the PFM mode; and one or more PWM functional blocks of the set of PWM functional blocks are activated.

17. The method of claim 16, wherein the handover state is entered in preparation of a transition from operating the power converter in the PFM mode to operating the power converter in the PWM mode.

* * * * *